March 3, 1959   M. H. O'SULLIVAN   2,875,549
FISHING LURE
Filed July 3, 1956

INVENTOR.
Martin H. O'Sullivan
BY William P. Porcelli
Atty

2,875,549

FISHING LURE

Martin H. O'Sullivan, Chicago, Ill.

Application July 3, 1956, Serial No. 595,633

1 Claim. (Cl. 43—42.22)

This invention relates to improvements in fishing lures and particularly to one which is adjustable for adapting it for use either on the surface of the water or as a diver.

It is the principal object of this invention to provide a fishing lure adjustable for use either as a surfacing lure or as a diver with improved means for alternately adjusting the lure for surfacing or diving in a simple and convenient manner as desired.

It is another object of this invention to provide such a lure which is adjustable for either surfacing or diving without a balance upset when adjusted to one or the other position, nor does it require special balancing in order to incorporate the adjustability.

It is another object of the invention to provide a lure of the type mentioned which has a minimum number of parts and which can be manufactured easily and economically.

The invention can be better understood by referring to the accompanying drawings, in which;

Fig. 2a is a top plan view of the portion of the fish lure between the arrows 2a—2a in Fig. 2;

Figure 1:
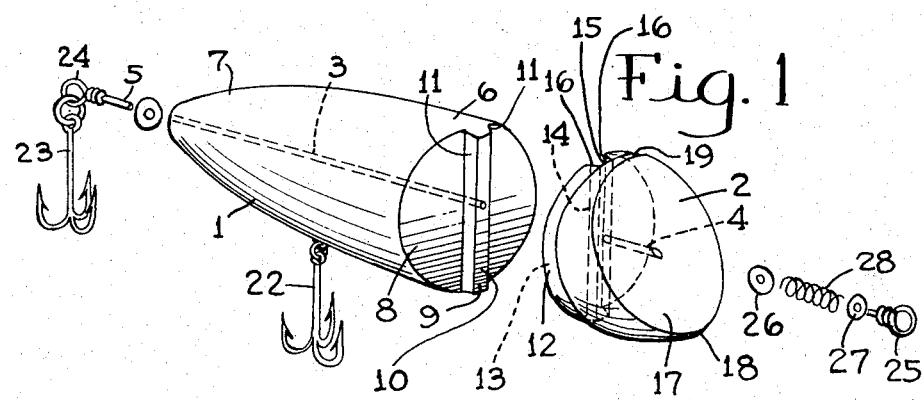
Figure 1 shows an exploded perspective view of a preferred embodiment of fishing lure made according to this invention.
Figure 2:
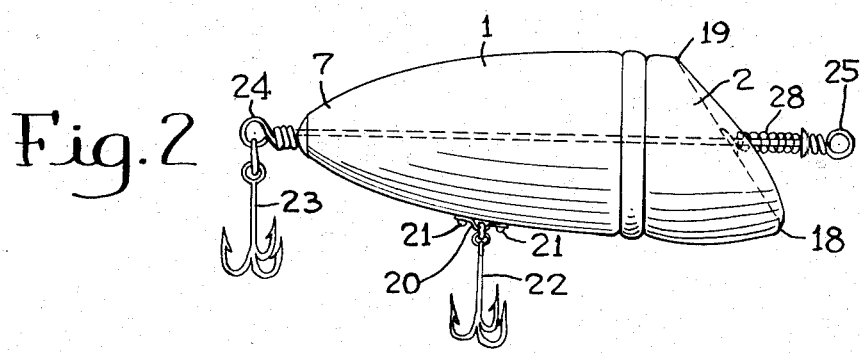
Fig. 2 shows a side elevation of the fishing lure adjusted for diving.
Figure 4:
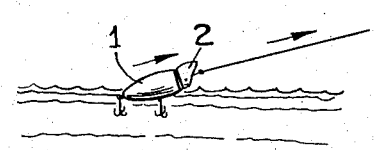
Fig. 4 shows a side elevation of the lure adjusted for surfacing and positioned in the water as it would ordinarily be used.
Figure 5:
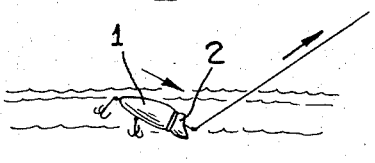
Fig. 5 shows a view similar to Fig. 4 of the fishing lure in the water, except that it is adjusted for diving.

A preferred embodiment of a fishing lure constructed according to this invention comprises a body member 1 and a head member 2 provided with holes 3 and 4 extending vertically and longitudinally through the two members, respectively. A stiff rod or wire 5 is threaded through these holes 3 and 4 to keep the body member 1 and the head member 2 in assembled longitudinal alignment. In Fig. 1, the wire 5 is shown broken. Actually, it extends in one piece entirely through the two members 1 and 2 as best shown in Fig. 2.

The body member 1 is enlarged at its forward end 6 and tapers back in a modified bulged cone shape to a smaller end 7. The forward face 8 of the body member 1 is provided with a projecting rib or tongue 9 which extends diametrically across the face 8 vertically from top to bottom. The tongue 9 is provided with a front wall 10 connected to two side walls 11 which are slightly convergent in a forward direction toward the wall 10.

The head member 2 is provided at its rear end 12 with a flat face 13 which is provided with a groove 14 corresponding in size to the tongue 9 on the body member 1. The groove 14 extends vertically and diametrically across the face 13 from top to bottom of the head member 2. The groove 14 is provided with a bottom wall 15 and two outwardly divergent side walls 16 connected to it. The reason the walls of the tongue 9 are convergent and the walls of the groove 14 are divergent, as mentioned, is to permit the tongue to readily locate itself within the groove without binding. The front face of the head member 2 consists of a shallow somewhat scooped surface 17 which slopes angularly back from a forward tip 18 to a rearward portion 19. The rearward portion 19 lies opposite one end of the groove 14 while the forward tip 18 lies directly opposite the other end of the groove 14 in such a manner that a single plane could be passed through the longitudinal center line of the groove 14, the rear portion 19 and the forward tip 18.

Even though the tongue and groove are shown extending vertically, they could just as well be positioned horizontally without upsetting the balance of the lure.

The lower mid-portion of the body member 1 is provided with a bracket 20 fastened to the body member by means of screws 21 and this bracket pivotally supports a fish hook 22. This location of the fish hook 22 provides weight along the lower portion of the body member 1 so that the lure ordinarily assumes a floating position with the hook 22 hanging downwardly. Still another hook 23 is provided at the rear of the fishing lure by being fastened to a loop 24 formed in the end of the stiff wire 5. The forward end of this rod 5 is provided with another loop 25 to which the fishing line can be attached. Between the head member 2 and this loop 25, two washers 26 and 27 are threaded on the stiff wire 5 and a compression spring 28 is also threaded on it and lies between the two washers 26 and 27.

Figure 3:
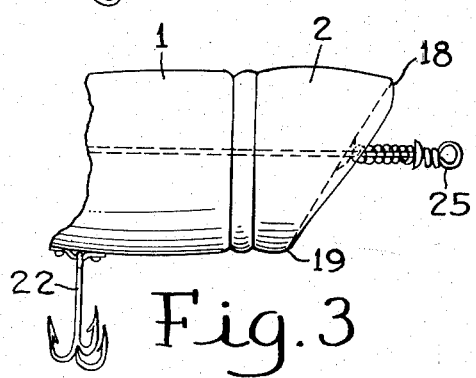
Fig. 3 shows a partial side elevation of the lure of Fig. 2, but adjusted for surfacing.

In one of its ordinary positions, such as when it is adjusted for diving, the fishing lure has the appearance shown in Fig. 2. Its head member 2 is positioned so that the forward tip 18 along the lower portion of the lure corresponds to the position of the hook 22. When it is desired to change the fishing lure from a diver to one for use on the surface of the water, the head member 2 is rotated through 180 degrees on the stiff wire 5 as a pivot until it assumes a position, as shown in Fig. 3, with the forward tip 18 at a high spot on the lure. In order to rotate this head member as described, it is necessary to pull the head member 2 longitudinally away from the body member in order to release the tongue 9 from the groove 14. When this is done, the spring 28 is compressed. After the head member 2 is rotated through its 180 degree path of travel, the tongue 9 again engages the groove 14 when the head member 2 is released because of the pressure derived from the compression spring 28.

Since the tongue and groove connection between the body and head members requires no additional parts, it is believed that the lure described is composed of a minimum of parts and can be manufactured easily and economically. In addition, the tongue and groove both extend for the entire width of the members in which they are formed so that no unbalance is provided in the lure other than what it would ordinarily have if not adjustable for either surfacing or diving. Other adjustable means might ordinarily require the addition of weights as a compensating means for the unbalance introduced by the addition of the adjustable means. This invention does not.

I claim:

A fishing lure comprising a body member and a head member threaded onto a rod in longitudinal alignment with each other, said head member having a slanted front face and being rotatably adjustable to direct the slant of the front face either upwardly or downwardly when the head member is rotated on the shaft relative to the body member, said body member carrying a hook having weight sufficient to cause the fishing lure to statically float with the hook hanging downwardly, the front face of the body member being resiliently urged into abutment with the rear face of the head member, one of the said body or head members being provided with a tongue extending diametrically across its immediate abutting face and the other with a groove extending diametrically across its immediate abutting face, said tongue and groove engaging each other to maintain the rotated position of the body member relative to said head member when said members are abutting, said tongue being provided with outwardly convergent side walls corresponding in angularity with inwardly convergent side walls of said groove to facilitate engagement of the tongue within the groove without binding.

References Cited in the file of this patent

UNITED STATES PATENTS

| | | |
|---|---|---|
| 1,445,916 | Smith | Feb. 20, 1923 |
| 1,842,591 | Dunkelberger | Jan. 26, 1932 |
| 2,267,802 | Purdy | Dec. 30, 1941 |
| 2,429,284 | Wildhaber | Oct. 21, 1947 |
| 2,482,309 | Wilson | Sept. 20, 1949 |
| 2,563,282 | Schenck | Aug. 7, 1951 |
| 2,615,274 | Slough | Oct. 28, 1952 |
| 2,617,673 | Sacks | Nov. 11, 1952 |
| 2,692,205 | Greider | Oct. 19, 1954 |